July 8, 1969
E. M. DETERS
3,454,195
LEAK DETECTING APPARATUS
Filed Aug. 9, 1967
Sheet 1 of 2
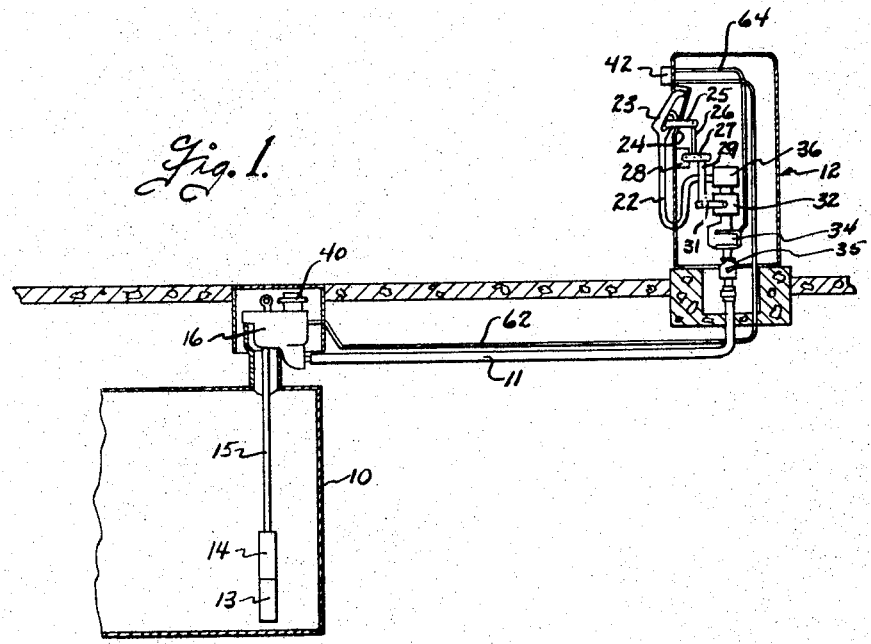
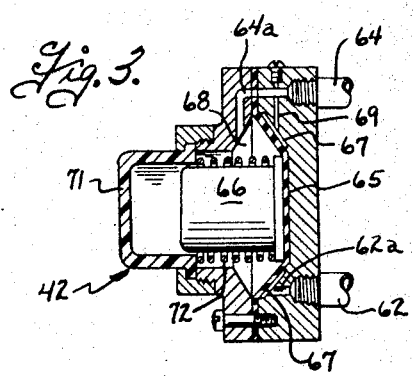
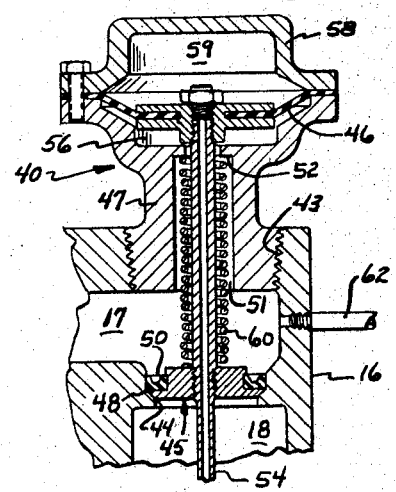
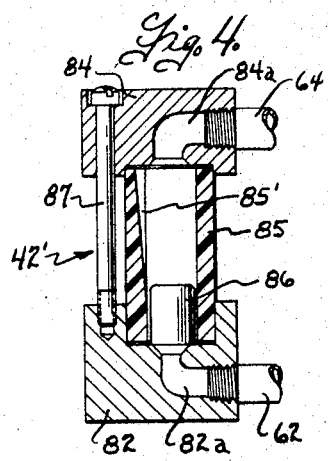
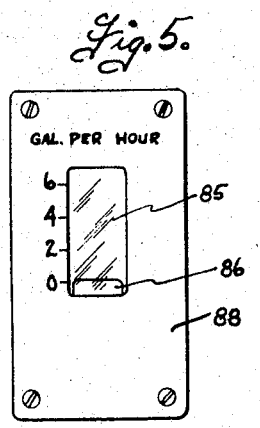
Inventor
Elmer M. Deters
By
McCanna, Morsbach & Pillote
Attorneys

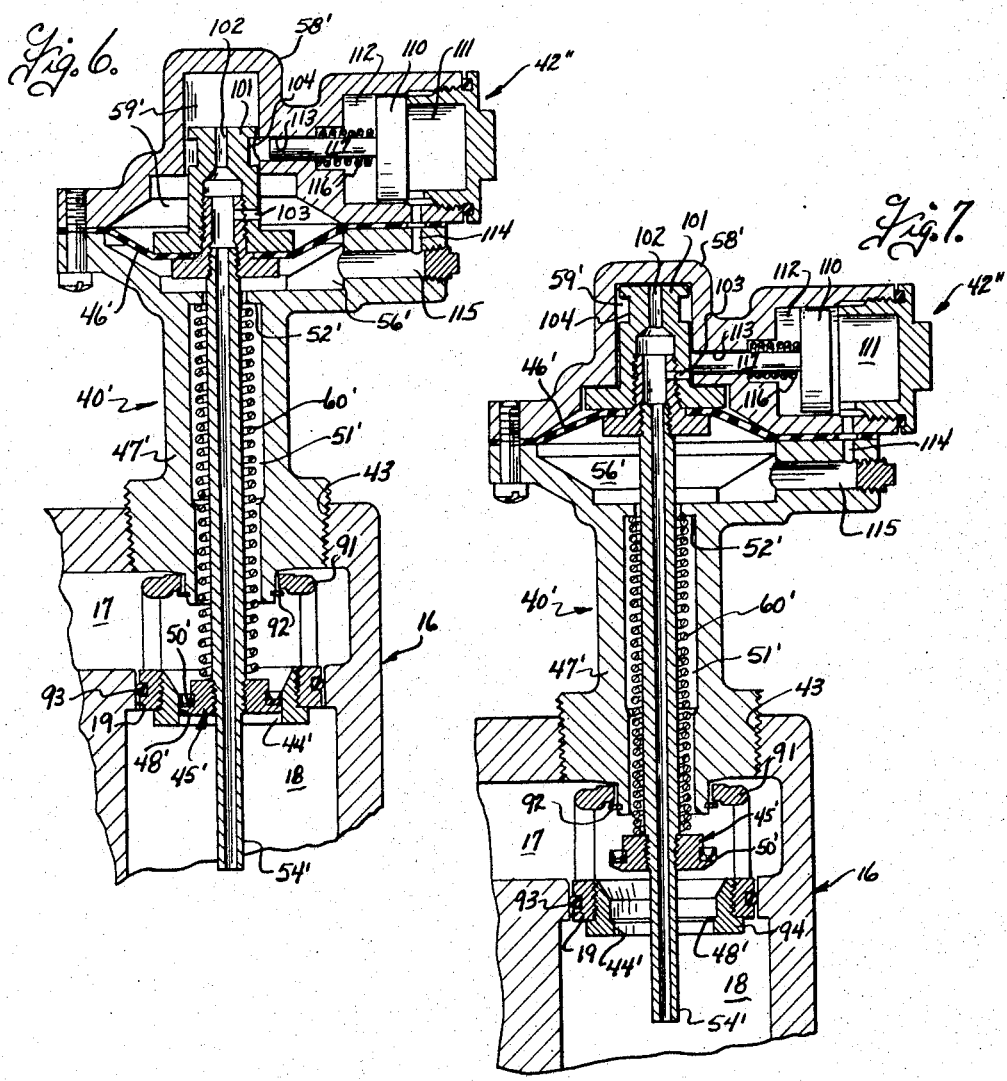
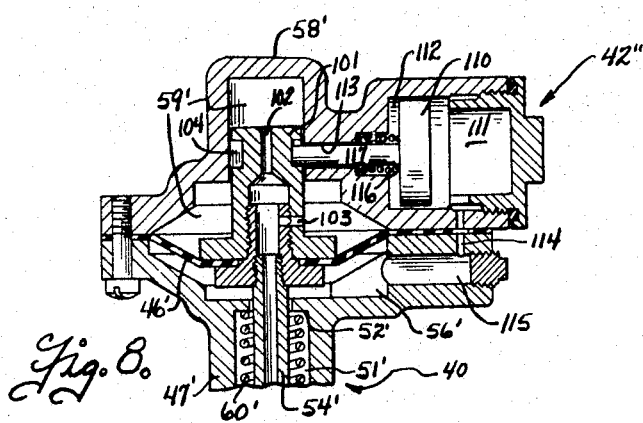

ated July 8, 1969

3,454,195
LEAK DETECTING APPARATUS
Elmer M. Deters, Davenport, Iowa, assignor to Red Jacket Manufacturing Company, Davenport, Iowa, a corporation of Iowa
Filed Aug. 9, 1967, Ser. No. 663,191
Int. Cl. B67d 5/08, 5/14; G01m 3/08
U.S. Cl. 222—52                                17 Claims

ABSTRACT OF THE DISCLOSURE

A liquid storage tank and a supply line leading from the tank to an outlet at a pedestal. A pump at the tank for pumping liquid to the supply line. A leak detector at the inlet of the supply line for detecting leakage in excess of a preselected rate when the pump is operating and indicating a warning when a leak exists. The warning may be a visual indication at the pedestal or mechanism for locking a valve to prevent dispensing of liquid.

Background

The invention pertains to apparatus for detecting leaks in a fluid handling conduit through which fluid is intermittently delivered under pressure.

In dispensing gasoline at service stations, the pump is intermittently operated to deliver gasoline under pressure to a supply line leading to a valved outlet at a dispensing pedestal. The fluid in the line is under pressure during dispensing and, if there is a leak in the line, the fluid will flow into the relatively lower pressure area around the line. When handling flammable materials such as gasoline, continued leakage can produce a hazardous condition. Detection of leaks, however, is complicated by a wide variation of pressure in the supply line during normal operation of the system. The pressure will rise to full pump delivery pressure when the pump is operated and the outlet valve is closed, and this pressure will decrease somewhat when the outlet valve is opened. When the pump is stopped, the line pressure can also change even in the absence of a leak. Opening the outlet valve when the pump is stopped can reduce line pressure, as can leakage of the pump valve or the packer check valve. Contraction of the fluid in the line can also reduce pressure. While it is important to detect leakage of flammable materials, complete termination of flow of fluid in the presence of a leak is not satisfactory either.

Previous leak detecting apparatus for systems of this general nature include Patents No. 2,952,387 through 2,952,390 and 3,183,723. Many previous designs operated to warn of a leak when the pump was not operating.

Summary

The present invention relates to improvements in leak detecting apparatus.

The invention provides a valve adjacent the inlet of the supply line and which will substantially close when a small differential pressure exists between the pump pressure and the line pressure. Means is provided for then supplying additional flow to the supply line at a preselected rate, and the apparatus then determines whether leakage exists. If the pressures can equalize, an indication of no leakage is given; if the pressures cannot equalize, an excessive leak exists, and the apparatus gives a leakage indication or signal.

The present invention is generally adapted for use in detecting leaks from a supply line during operation of the pump. In this manner, the apparatus is not influenced by any leakage from the pump when it is stopped, nor from the packer check valve or any relief valve. Also, the effects of air in the system or thermal expansion or contraction are alleviated.

It is an object of this invention to provide an apparatus for detecting leaks from a supply line through which fluid is intermittently delivered under pressure and which apparatus will detect leaks during operation of the pump.

Another object is to provide an apparatus which provides for quick filling of an empty system.

Still another object of this invention is to provide a leak detecting apparatus which will prevent full flow through the delivery line in the event of a leak, and which may be adapted to thereafter provide full flow through the line.

Another object is to provide a leak detecting apparatus which indicates the approximate rate of leakage from the delivery line.

These, together with other objects and advantages, will become apparent as the invention becomes better understood from the following detailed description when taken in conjunction with the drawings.

Drawing

FIGURE 1 is a diagrammatic view of a service station installation having a leak detecting apparatus of the present invention applied thereto;

FIG. 2 is a vertical sectional view of a detector valve utilized in the installation of FIG. 1;

FIG. 3 is a vertical sectional view of an indicator for warning that a leak exists;

FIG. 4 is a vertical sectional view of an indicator for giving the approximate leakage rate;

FIG. 5 is a front view of the rate indicator of FIG. 4;

FIG. 6 is a vertical sectional view of a leak detecting apparatus including a valve similar to that shown in FIG. 2 and a leak indicator in the form of a lock member, and illustrating the relative position of the parts when the pressures are balanced;

FIG. 7 is a view similar to FIG. 6 but illustrating a moved position of the parts; and FIG. 8 is a fragmentary vertical sectional view through the leak detecting apparatus of FIG. 6 and illustrating a different moved position.

Description

As previously described, the present invention is adapted for detecting leaks in a supply line through which liquid is intermittently pumped under pressure and is herein shown applied to a gasoline service station installation. Such an installation is diagrammatically illustrated in FIG. 1 and includes an underground tank 10 for storing a quantity of gasoline and a supply line 11 for delivering gasoline from the tank to a pedestal 12. A pump 13 and a motor 14, herein shown of the submersible type, are provided in the tank for pumping gasoline from the tank 10 through a discharge line 15 to a discharge head or casing 16. The casing 16 defines a flow passage including an inlet chamber 17 connected to discharge line 15, and an outlet chamber 18 connected to supply line 11. The casing or discharge head 16 may also include a check valve (not shown) arranged to open to allow flow from the discharge line 15 through the passage, and yieldably urged to a closed position to prevent return flow.

A valve mechanism is also provided at the pedestal 12 and arranged to be closed when the pump 13 is stopped to thereby normally maintain the supply line 11 under pressure. As shown herein, the supply line includes a delivery hose 22 having a conventional normally closed nozzle valve 23 at the outlet end thereof. The nozzle valve 23 is manually operable to its open position to permit dispensing of gasoline. The pedestal 12 also includes a conventional nozzle support 24 and a switch lever 25 which extends outwardly of the nozzle support. Switch lever 25 is connected through a link 26 to an operating lever 27 of a pump control switch 28. The switch lever 25 is also connected through a link 29 to an operating lever 31 of an interlock valve 32. The interlock valve is of conventional construction and is disposed in the supply line leading to the hose 22 and is normally closed, being opened in response to movement of the switch lever 25 to a position to close the pump control switch 28. A filter 34 and a normally open safety valve 35 are also conveniently interposed in the supply line. A check valve (not shown) is also commonly used in the supply line either before or after the interlock valve, and a meter 36 is provided for measuring the quantity of gasoline passing therethrough.

When the pump 13 is operating, the fluid in the supply line 11 is under pressure. Any significant leak in the line can, over a prolonged period, cause a dangerous accumulation of gasoline in the ground surrounding the line. A leak detecting apparatus is provided for detecting any leaks in excess of a preselected rate from the line, and for giving an indication or signal of the presence of a leak. In the embodiment of FIGS. 1–3, the leak detecting apparatus includes a detector valve, generally designated 40, and an indicator 42. Detector valve 40 is advantageously mounted on discharge head 16, and indicator 42 is advantageously located on the pedestal 12 and adjacent nozzle valve 23. In this manner, the indicator 42 is remote from the detector valve and can advantageously be observed by an attendant about to operate the nozzle valve 23.

As shown in FIG. 2, detector valve 40 is mounted in a threaded opening 43 in the top of casing 16 and controls the flow through a port opening 44 between the inlet chamber 17 and the outlet chamber 18. Detector valve 40 generally includes a valve member 45 for controlling flow through the port opening, and a pressure responsive operator 46 for moving the valve member. The pressure responsive operator is responsive to the pressure at the inlet and outlet sides of the valve 45 and is operative to move the valve member to a position providing full flow from the inlet chamber 17 to the outlet chamber 18 when the inlet pressure is greater than the outlet pressure by a preselected amount. The pressure responsive operator is also operative to move the valve member to a closed position substantially blocking flow through the port when the outlet pressure increases to a preselected intermediate range slightly less than the inlet pressure. A quantity of gasoline is then passed into supply line 11, and its effect determines whether a leak exists in the supply line, as hereinafter described.

Referring more specifically to FIG. 2, the detector valve 40 includes a tubular body 47 conveniently threaded into the opening 43 in the casing 16. An annular seat 48 is formed adjacent the opening 44 to receive the valve member 45. An annular ring 50 is mounted in a groove in the outer periphery of valve member 45 to seal off the port 44 when valve member 45 is seated on the annular seat. The body 47 has an opening 51 aligned with the port 44 and defining a shoulder 52 adjacent its upper end. A hollow valve stem 54 is secured to the valve member 45 and extends laterally therefrom through the opening 51. The pressure responsive operator 46 herein shown in the form of a flexible diaphragm, is secured adjacent the upper end of the valve stem 54 and defines a chamber 56 between itself and the body 47. It can be seen that spacing is provided between the opening 51 and valve stem 54, even at shoulder 52, to communicate chamber 56 with the inlet chamber 17. In this manner, chamber 56 is directly responsive to inlet pressure. A cap 58 overlies the end of the body 47 and defines a chamber 59 between the cap and the diaphragm 46. As previously stated, valve stem 54 is hollow, and thus chamber 59 is communicated with outlet chamber 18 through the hollow valve stem 54. In this manner, chamber 59 is directly responsive to outlet pressure or supply line pressure. The valve member 45 is yieldably urged axially by a spring 60 to a position illustrated in FIG. 2.

It can be seen that the diaphragm 46 has an area larger than the area of valve member 45. By way of example, diaphragm 46 has an area of about 3.5 square inches, valve member 45 has an area of about 1.2 square inches, and spring 60 has a compressive strength of about 8 pounds. When the pressure in supply line 11 is relatively low, and the pump 13 is started, inlet or delivery pressure on diaphragm 46 will cause opening of valve member 45 to allow free flow to the supply line. When the supply line pressure builds up to an intermediate range, for example, about 3 pounds less than delivery pressure, the pressure responsive operator 46 and the spring 60 move the valve member to closed position shown in FIG. 2. At this point, additional liquid is fed to the supply line 11 at a preselected rate and, if the pressures equalize, no leak in excess of the preselected rate exists in the supply line. In the embodiment of FIGS. 1–3, this additional fluid is fed through line 62 under pump pressure to indicator 42 and therefrom through line 64 to the supply line 11. As illustrated, line 62 is connected to inlet chamber 17, and line 64 is connected to filter 34. It is contemplated that pump pressure on line 62 may be accomplished in other ways and that the flow may be fed to supply line 11 at other positions therealong, as will hereafter become apparent.

Referring more specifically to FIG. 3, the indicator 42 is generally hollow and has a movable wall therein. In the embodiment illustrated, the movable wall includes a flexible diaphragm 65 and a piston 66 thereadjacent. The diaphragm 65 divides the interior of the indicator into a first chamber 67 and a second chamber 68. Chamber 67 is connected to line 62 by passage 62a, and chamber 68 is connected to line 64 by passage 64a. In this manner, chamber 67 is responsive to pump or inlet pressure, and chamber 68 is responsive to line pressure. An orifice 69 is provided between chamber 67 and passage 64a to pass fluid to the supply line at a restricted rate. By way of example, and orifice 69 of about .04 inch diameter and about one-half inch length will pass a flow of about three gallons per hour at about three pounds differential pressure in gasoline. The indicator is provided with a window 71 conveniently formed of transparent synthetic resin, through which the position of piston 66 may be observed. The piston is resiliently urged toward a retracted position, as illustrated in FIG. 3, by means of a spring 72. The compressibility of the spring is selected so that when a difference in pressures between chambers 67 and 68 exists, the piston will move to an extended position. In other words, when the supply line 11 is supplied with fluid and is at the intermediate pressure, additional fluid is passed through orifice 69 at a rate which may be called a preselected leakage rate. With the difference in pressure, diaphragm 65 and piston 66 will assume an extended position. If the pressures can equalize, the piston returns to the retracted position. If the pressures cannot equalize, a leak in excess of the preselected leakage rate exists, and the piston remains exposed, thereby giving a visual indication or warning of leakage in excess of the preselected rate.

Another form of visual indicator, generally designated 42′, is illustrated in FIGS. 4 and 5. As illustrated, indicator 42′ includes spaced blocks 82 and 84 having passageways 82a and 84a, respectively connected to lines 62 and 64. A tubular portion 85 interconnects passages 82a and 84a and is advantageously formed of transparent thermoplastic material for observation of a movable wall in the form of piston 86 disposed therein. A fastener 87 interconnects blocks 82 and 84 to hold the portion 85 in the position shown. As illustrated, piston 86 defines a restricted flow area between its side and the interior of tubular portion 85, thereby restricting the flow from line 62 to line 64 to a predetermined rate. A slot 85′ is advantageously provided at one side of the inner surface of portion 85 to allow increased flow as the piston 86 rises. In other words, when supply line 11 has been filled with fluid to said intermediate pressure, fluid passes from line 62 to line 64 along the restricted passage between the piston 86 and the inside wall of portion 85. If no leakage exists, this will cause the pressure in lines 11 and 64 to equalize the pressure in line 62 and hence rise to pump pressure. If there is a significant leak, the pressure in lines 11 and 64 will decrease, thereby causing piston 86 to move upwardly in portion 85, and allowing increased flow from line 62 to line 64. This increased flow will be at a rate approximating the leakage rate from the supply line 11. As shown in FIG. 5, indicia can be provided on a cover plate 88 secured to the blocks 82 and 84 to give a visual indication of the rate of leakage, for example, in gallons per hour. It is contemplated that indicator 42' may be mounted on the pedestal 12 in place of indicator 42, if desired.

In the aforedescribed embodiments, the detector valve 40 closes when the differential pressure between the pump and the line is a preselected amount, for example, about three pounds. With the detector valve in closed position and the pump running, any leakage from the line will operate the indicator. Rate indicator 42' will measure the leakage rate as any leakage from the line must pass through it. Warning indicator 42 will expose the piston or plunger 66 as long as the differential pressure exists. With leakage greater than the preselected flow through the restricting by-pass 69, plunger 66 will remain exposed and will not resume the retracted position.

Referring now to FIGS. 6–8, a particularly advantageous embodiment of the leak detecting apparatus will be described. In this embodiment, the detector valve and the indicator are advantageously mounted adjacent each other, and the indicator operates to lock the detector valve in a closed position to prevent flow to the outlet. Many of the parts of the detector valve 40' are similar to, and provide the same function as, those previously described and are designated by the same numerals followed by the postscript prime (').

In the embodiment of FIGS. 6–8, the annular seat 48' is advantageously mounted on the body 47' for accurate alignment of the opening 51' therewith. As illustrated, the casing 16 is provided with a larger opening 19. An apertured section 91 is mounted on body 47' by means of fasteners 92. An O-ring 93 is provided between section 91 and opening 19 and in sealing relation therewith. An insert 94, defining the annular seat 48' and the port 44', is threaded onto the section 91 as illustrated. At the upper end of valve stem 54' is an extension 101 having ports 102 and 103 communicating the hollow interior of the valve stem with chamber 59'. Extension 101 also has an annular slot or groove 104 defining a latch engaging keeper for a purpose hereinafter explained.

Cap 58', as can be seen, is of different configuration than cap 58 and advantageously provides a housing for a locking-type indicator, generally designated 42". As shown, a movable wall, herein shown in the form of a piston 110, is disposed in a hollow portion of cap 58' and divides the portion into expansible and contractible chambers 111 and 112. A passageway 113 communicates chamber 112 with chamber 59' and passageways 114 and 115 communicate chamber 111 with chamber 56'. In this manner, chamber 111 is responsive to the pressure in inlet chamber 17 or pump pressure. Chamber 112 is responsive to pressure in outlet chamber 18 or line pressure. Piston 110 defines a restrictive flow area along the periphery thereof to allow flow from the inlet to the outlet at a preselected restricted rate. By way of example, from approximately .001 to .002 inch clearance between piston 110 and the wall of chambers 111 and 112 provides an acceptable leakage rate. Alternately, a diaphragm or bellows, having a by-pass orifice similar to orifice 69, may be used for piston 110. In the embodiment shown, piston 110 is resiliently urged to a retracted position shown in FIG. 6 by a spring 116. A laterally extending stem 117 is connected to the piston to engage extension 101 as shown in FIGS. 7 and 8.

As explained above, when the pressure in line 11 and hence chamber 18 is at a relatively low pressure and the pump is started, pump pressure is exerted at inlet chamber 17 and chamber 56', causing the valve member 45 to move from the position of FIG. 6 to the position shown in FIG. 7 and allowing full flow to the line 11. Because of the intercommunication, chamber 111 is also exposed to pump pressure and causes piston 110 to move the stem 117 to an extended position. However, diaphragm 46' is arranged to react sooner to pump pressure than piston 110, and hence the stem 117 is not extended fast enough to be engaged in groove 104 of valve extension 101. Thus, the elements will be in the position of FIG. 7. When the pressures reach said preselected amount, spring 60' operates to overcome the pressure differential on diaphragm 46' and moves valve member 45' to closed position. At this point, then, stem 117 engages groove 104 because of the differential pressure between chambers 111 and 112. Additional fluid is provided to line 11 by said aforedescribed restricted flow along the side of piston 110 and through valve stem 54'. If the pressures can equalize, piston 110 will be retracted under the effect of spring 116, and subsequent opening of outlet valve 23 will again cause differential pressure on diaphragm 46' and open valve member 45' to allow free flow to the pedestal.

The apparatus of FIGS. 6–8 is advantageously arranged to provide for free flow to the pedestal even in the presence of a leak, if desired. Assuming that a leak exists, stem 117 is engaged in groove 104 as illustrated in FIG. 8. Upon subsequent operation of outlet valve 23, the only flow to line 11 would be by-passed at the restricted rate. This indicates a definite warning to the attendant that leakage exists. The attendant may then dispense gasoline at free flow, if desired, by turning off the pump by operation of switch lever 25. The pressures throughout the system will then balance, and the relative parts will be in the position shown in FIG. 6. The procedure is then to open outlet valve 23 and thereafter start the pump through actuation of switch lever 25. This creates a pressure differential similar to the initial pressure differential previously described, with the various parts assuming the position illustrated in FIG. 7. In this manner, free flow is provided to the outlet and allows dispensing of gasoline even in the presence of a substantial leak. Thus, the station need not be shut down, but an unnatural procedure must be followed, thereby giving continual warning of the leak.

While preferred embodiments of the present invention have herein been illustrated and described, this has been done by way of illustration and not limitation, and the invention should not be limited except as required by the scope of the appended claims.

What is claimed is:

1. An apparatus for detecting leakage in excess of a preselected leakage rate from a fluid supply line through which fluid is intermittently delivered under pressure and wherein the supply line pressure can vary over a wide range between a low pressure and a relatively higher delivery pressure, said apparatus including: a casing having an inlet and an outlet adapted to pass fluid therethrough to the supply line, pressure responsive valve means responsive to the delivery pressure and the supply line pressure and located intermediate said inlet and outlet for controlling flow therebetween; said pressure responsive valve means operative for delivering free flow to the supply line when the differential between the supply line pressure and the delivery pressure is greater than a preselected amount and for preventing free flow to the supply line when the pressure differential reaches said preselected amount; means for furnishing flow to the supply line at said preselected leakage rate when free flow is prevented, and means responsive to said pressure differential for indicating a warning when the supply line pressure fails to substantially equalize the delivery pressure while being provided with flow at said preselected leakage rate.

2. An apparatus as set forth in claim 1 wherein the pressure responsive valve means includes a valve port intermediate said inlet and outlet; a valve member cooperable with said port for controlling flow between said inlet and outlet; and means responsive to the differential between the supply line pressure and the delivery pressure for positioning the valve member at one position to permit free flow through the port when the pressure differential is greater than said preselected amount, for positioning the valve member at a second position to block free flow through the port when the pressure differential reaches said preselected amount, and for returning the valve member to said one position for delivery of fluid through the supply line at free flow.

3. An apparatus as set forth in claim 2 wherein the pressure responsive valve means includes a by-pass providing flow at said preselected rate when the valve means is at said second position, said by-pass having one end connected to the inlet side of the port and another end connected to the delivery line side of the port; and wherein the means for indicating a warning is interposed between the ends of the by-pass.

4. An apparatus as set forth in claim 3 wherein the means for indicating a warning comprises a lock mechanism movable from one position permitting free movement of the valve member and another position for holding the valve member in the second position while the pressure differential exists and the delivery line is being provided with flow at said preselected leakage rate.

5. An apparatus as set forth in claim 1 wherein: the delivery line has a remote outlet and a valve adjacent the outlet for controlling flow from the delivery line; the pressure responsive valve means includes a by-pass having one end connected to receive flow at delivery pressure and another end connected to the delivery line; and the warning indicating means is interposed in the by-pass and located adjacent the outlet, said warning indicating means being arranged to give a visual indication when the delivery line pressure fails to increase while being provided with flow at said preselected leakage rate.

6. An apparatus as set forth in claim 5 wherein the warning indicating means comprises a chamber having an inlet connected to the by-pass for receiving flow at delivery pressure and an outlet connected to the by-pass leading to the delivery line, a movable wall between said inlet and outlet, an orifice for controlling flow from the inlet side of the chamber to the outlet at said preselected leakage rate, resilient means associated with said wall for urging the wall toward a normal position, and said wall adapted to move to a warning position when there is a pressure differential between said inlet and outlet and to return to said normal position when the pressure differential substantially equalizes thereby indicating no leak in excess of said preselected leakage rate.

7. An apparatus as set forth in claim 5 wherein the warning indicating means comprises a chamber having an inlet connected to the by-pass for receiving delivery pressure and an outlet connected to the by-pass leading to the delivery line, a flow actuated plunger in the chamber defining a variable restricted flow area therebetween and movable in the direction of liquid flow from the inlet to the outlet, said plunger movable from one position restricting flow to said preselected leakage rate to an extended position to permit a larger flow through the by-pass, and means calibrating the distance between said one and extended positions for indicating the rate of leakage in excess of said preselected rate.

8. An apparatus as set forth in claim 1 wherein said warning indicating means comprises locking means for holding the pressure responsive valve means in a position preventing free flow to the delivery line.

9. In a liquid pumping system including a liquid supply source, a supply line having an inlet end and a remote delivery outlet, an outlet valve adjacent the delivery outlet for selectively controlling flow of liquid therethrough, and a pump at the source selectively operable to intermittently pump liquid to the supply line under delivery pressure whereby the pressure in the supply line can vary over a wide range between full delivery pressure when the pump is stopped, the improvement comprising means for detecting leakage in excess of a preselected rate from the supply line and including: a casing having an outlet connected to the inlet end of the supply line and an inlet for receiving liquid from the pump, said casing having a valve port intermediate the inlet and outlet, a valve member cooperable with said valve port for controlling flow between said inlet and outlet, means responsive to the delivery pressure and the supply line pressure for positioning said valve member at an open position to provide free flow to the supply line when the pump is operated and the differential between said pressures is greater than a preselected amount, said pressure responsive means being operative to move said valve member to a closed position when the pressure differential reaches said preselected amount, means for providing additional liquid to the supply line at said preselected leakage rate when the valve member is in said closed position, and means responsive to the pressure differential for indicating a warning when the supply line pressure fails to increase when the outlet valve and said valve member are closed and the supply line is provided with additional liquid at the preselected leakage rate.

10. A liquid pumping system as set forth in claim 9 wherein the means for providing additional liquid to the supply line includes a by-pass line having an inlet operatively connected to the inlet side of the valve port and an outlet operatively connected to the outlet side thereof; and wherein the last-mentioned means includes: a member interposed in the by-pass line for comparing the delivery and supply line pressures, said member movable from said one position to a warning position when a pressure differential exists and movable back to said one position when the pressures substantially equalize.

11. A liquid pumping system as set forth in claim 9 wherein the means for providing additional liquid to the supply line includes a by-pass line having an inlet operatively connected to the inlet side of the valve port and an outlet operatively connected to the outlet side thereof; and wherein the last-mentioned means includes a chamber interposed in the by-pass line and adjacent the delivery outlet, means in the chamber for restricting by-pass flow to said preselected leakage rate when the valve member is closed and for increasing the rate when pressure differential increases, and means for measuring the rate of flow through the chamber to indicate the leakage rate.

12. A liquid pumping system as set forth in claim 9 wherein: the last-mentioned means includes a locking member movable in one direction from a release position toward a locking position in response to said pressure differential and adapted to return to release position when the pressures on the inlet and outlet sides of the port are substantially equalized; the valve member includes means for engaging the locking member in its locking position when the valve member is in closed position to hold the valve member in said position; and the valve member is arranged to initially move from its closed position to open position quicker than the locking member moves to its locked position so that liquid is pumped to the supply line at free flow until the preselected pressure differential is achieved.

13. A liquid pumping system as set forth in claim 12 wherein the locking member is adapted to return to release position when the pump is stopped and the pressures are approximately equalized, and the outlet valve is adapted for opening prior to starting the pump, whereby the valve member is moved to said initially open position when the outlet valve is opened and the pump started so that liquid can be dispensed through the outlet in the presence of a leak in excess of said preselected rate.

14. In a liquid pumping system including a liquid supply source, a supply line having an inlet end and a remote delivery outlet, an outlet valve adjacent the delivery outlet for selectively controlling flow of liquid therethrough, and a pump at the source selectively operable to intermittently pump the liquid to the supply line under delivery pressure whereby the pressure in the supply line can vary over a wide range between full delivery pressure when the pump is operated and the outlet valve is closed and a relatively low pressure when the pump is stopped, the improvement comprising means for detecting leakage in excess of a preselected rate from the supply line and including: a casing defining a flow passage having an inlet for receiving liquid from the pump and an outlet connected to the inlet end of the supply line; said casing having a port between its inlet and outlet; a valve member cooperable with the port to control flow therethrough and movable between an open position to allow free flow through the port and a closed position blocking free flow therethrough; pressure responsive means responsive to the delivery pressure and the supply line pressure for positioning the valve member at open position to allow free flow to the delivery line when the pump is operated and the differential between the supply line pressure and the delivery pressure is more than a preselected amount; the pressure responsive means being operative to move the valve member to closed position when the supply line pressure increases so that the pressure differential is at said preselected amount; the pressure responsive mean including resilient means for yieldably urging the valve member toward closed position and thereby defining said preselected amount of pressure differential; means for providing additional liquid to the supply line at the preselected leakage rate when the valve member is in closed position; and locking means movable in response to the pressure differential between a release position when the delivery and supply line pressures are substantially equalized and a locking position when a pressure differential exists for holding the valve member in its closed position; whereby the supply line pressure will fail to equalize the delivery pressure while being supplied with additional liquid at said preselected rate and a leak in excess of said rate exists; and whereby the locking means will hold the valve member in closed position when an excessive leak exists.

15. The combination of claim 14 wherein the casing has an opening generally aligned with the port; and including a valve stem connected to the valve member and extending through said casing opening; and wherein the pressure responsive means includes a movable wall connected to the valve stem outwardly of the opening, and means defining first and second expansible and contractible pressure chambers on either side of the wall; said casing opening communicating the first chamber with the flow passage adjacent the inlet side of the port to provide supply pressure to the first chamber; means communicating the second chamber with the supply line pressure at the outlet side of the port; whereby the valve member is moved to open position by a delivery pressure force on the wall greater than the total of supply line pressure force on the wall and force by the resilient means.

16. The combination of claim 15 wherein the valve stem extends into the second pressure chamber; and wherein the locking means includes means defining a third chamber adjacent said second chamber, a movable partition in the third chamber dividing it into first and second portions, means for communicating the first portion with the pressure at the inlet side of the port, a passage communicating the second portion with the second chamber, the movable partition being responsive to the delivery and supply line pressures and movable from one position when the pressures are generally equal toward the second portion when the pressure differential exists, and latch means mounted on the movable partition and extending through said passage for engaging the valve stem in the second chamber when the movable partition moves toward the second portion and for locking the valve member in closed position.

17. The combination of claim 16 wherein the means for supplying additional fluid includes means providing flow from one side of the movable partition to the other and for restricting the flow to said preselected leakage rate.

References Cited
UNITED STATES PATENTS

| | | | |
|---|---|---|---|
| 2,281,125 | 4/1942 | Weimer | 73—40.5 |
| 3,273,753 | 9/1966 | Johnson et al. | 222—52 |

ROBERT B. REEVES, *Primary Examiner.*

H. S. LANE, *Assistant Examiner.*

U.S. Cl. X.R.

73—40.5

PO-1050
(5/69)

UNITED STATES PATENT OFFICE
CERTIFICATE OF CORRECTION

Patent No. 3,454,195            Dated July 8, 1969

Inventor(s) ELMER M. DETERS

It is certified that error appears in the above-identified patent and that said Letters Patent are hereby corrected as shown below:

Column 8, line 8, after "the" insert -- pump is operated and the outlet valve is closed and a --.

Column 9, line 33, change "mean" to -- means --.

SIGNED AND
SEALED

NOV 4 1969

(SEAL)
Attest:

Edward M. Fletcher, Jr.
Attesting Officer

WILLIAM E. SCHUYLER, JR.
Commissioner of Patents